United States Patent
Mori et al.

(10) Patent No.: US 10,886,065 B2
(45) Date of Patent: Jan. 5, 2021

(54) CERAMIC ELECTRONIC PART AND METHOD FOR MANUFACTURING THE SAME

(71) Applicant: Taiyo Yuden Co., Ltd., Tokyo (JP)

(72) Inventors: Fumi Mori, Tokyo (JP); Wakaaki Murai, Tokyo (JP)

(73) Assignee: Taiyo Yuden Co., Ltd, Tokyo (JP)

( * ) Notice: Subject to any disclaimer, the term of this patent is extended or adjusted under 35 U.S.C. 154(b) by 108 days.

(21) Appl. No.: 16/356,006

(22) Filed: Mar. 18, 2019

(65) Prior Publication Data

US 2019/0287720 A1 Sep. 19, 2019

(51) Int. Cl.
*H01G 4/228* (2006.01)
*H01G 4/12* (2006.01)
*H01G 4/012* (2006.01)

(52) U.S. Cl.
CPC ............ *H01G 4/12* (2013.01); *H01G 4/012* (2013.01); *H01G 4/228* (2013.01)

(58) Field of Classification Search
CPC ........... H01G 4/12; H01G 4/012; H01G 4/228
See application file for complete search history.

(56) References Cited

U.S. PATENT DOCUMENTS 10,475,584 B2 * 11/2019 Masunari ............... H01G 4/232
10,734,160 B2 * 8/2020 Mizuno .................. H01G 4/012
2014/0041914 A1 * 2/2014 Hattori ................... H01G 2/065
 174/260
2014/0367152 A1 * 12/2014 Lee ......................... H05K 1/111
 174/260
2017/0250026 A1 * 8/2017 Mizuno .................. H01G 4/232
2018/0374640 A1 * 12/2018 Akiyoshi ................. H01G 4/12

FOREIGN PATENT DOCUMENTS

| JP | 08-130160 A | 5/1996 |
|----|-------------|--------|
| JP | 2002-151346 A | 5/2002 |
| JP | 2015-228481 A | 12/2015 |

* cited by examiner

*Primary Examiner* — Dion Ferguson
(74) *Attorney, Agent, or Firm* — Chip Law Group

(57) ABSTRACT

A ceramic electronic part which includes a ceramic part body substantially in a parallelepiped form and having a first outer electrode at one end portion thereof and a second outer electrode at an opposite end portion thereof. The first outer electrode contiguously includes a main part provided on one surface in the third direction of the ceramic part body and a sub part provided on one surface in the first direction of the ceramic part body, and the second outer electrode contiguously includes a main part provided on one surface in the third direction of the ceramic part body and a sub part provided on an other surface in the first direction of the ceramic part body. The ceramic electronic part suffers warpage causing first and second maximum gaps to occur between centers in the second direction of the main parts of the outer electrodes and a virtual plane.

20 Claims, 6 Drawing Sheets

CERAMIC ELECTRONIC PART AND METHOD FOR MANUFACTURING THE SAME

CROSS REFERENCE TO RELATED APPLICATION

This application is based upon and claims benefit of priority from Japanese Patent Application No. 2018-051355, filed on Mar. 19, 2018, the entire contents of which are incorporated herein by reference.

BACKGROUND

The present technology relates to a ceramic electronic part such as a laminated ceramic capacitor and also to a method for manufacturing the same.

Ceramic electronic parts such as a laminated ceramic capacitor generally have a first outer electrode at a one end portion of a ceramic part body substantially in the form of a rectangular parallelepiped having a functional unit, such as a capacitor unit, built therein, and a second outer electrode at the opposite end. The main component of the ceramic part body (except for a conductive layer forming the functional unit) is a ceramic, and the main components of the respective outer electrodes are a metal.

In association with the thinning of electronic devices such as smart phones and note book personal computers, low-profile implementation (i.e. a low mounting height) has been required for such ceramic electronic parts as mentioned above. To satisfy the requirement, it is essential to thin the ceramic electronic parts.

For thinning of ceramic electronic parts, it is desirable to reduce the height (thickness) of a ceramic part body and to make the section of the respective outer electrodes substantially in an L form (see FIG. 5 of Japanese Patent Laid-open No. 2015-228481). Nevertheless, if the height (thickness) of the ceramic part body is reduced, the following concerns arise when the ceramic electronic part is mounted on a circuit board.

For mounting a ceramic electronic part on a circuit board, reflow soldering is generally adopted. This reflow soldering is a method in which a solder paste is applied onto pads corresponding to the respective outer electrodes provided on the circuit board, mounting a ceramic electronic part so that the respective outer electrodes are brought into contact with the solder paste, and charging, into a reflow oven, the circuit board mounting the ceramic electronic part thereon, followed by soldering the individual outer electrodes to the respective pads via preheating step, actual heating step and cooling step. The temperature of the actual heating step corresponds to a melting temperature of the solder paste and the temperature of the preheating step is lower than the temperature of the actual heating step.

Since the main component of the respective outer electrodes is a metal, the coefficient of thermal expansion of the respective outer electrodes is larger than the coefficient of thermal expansion of the ceramic part body that is made mainly of a ceramic. Accordingly, when the height (thickness) of the ceramic part body is reduced, particularly to 100 µm or below so as to thin the ceramic electronic part, the thermal expansion of the respective outer electrodes becomes larger than the thermal expansion of the ceramic part body during the preheating step of the reflow soldering process, resulting in warpage of the ceramic electronic part. More particularly, the warpage occurs in such a way that the facing side of the circuit board of the ceramic electronic part with the respective outer electrodes becomes projection in the direction of width thereof and the opposite side becomes recess.

More particularly, since the ceramic electronic part undergoes warpage as set out above during the course of the preheating step of the reflow soldering, the contact form between the respective outer electrode and the solder paste changes from the contact form at the time of the mounting. Consequently, the posture and direction of the ceramic electronic part becomes unstabilized due to the change of the contact form thereby causing positional deviation to be likely to occur. Additionally, since the actual heating step is carried out in this unstabilized state, the flow of the melted solder is deviated thereby increasing the positional deviation with concern that connection failure may result.

In other words, as to the thinning of the ceramic electronic part, it is very important in practical applications to design the ceramic electronic part so as not to permit the positional deviation upon reflow soldering in the case where the height (thickness) of the ceramic part body is reduced and particularly, even in the case where it is reduced to 100 µm or below.

In FIGS. 2 and 3 of Japanese Patent Laid-open No. 2002-151346, it is disclosed that a dummy conductor or a dummy pattern is provided on a ceramic part body to preliminarily form such a warpage on the ceramic electronic part that the facing side of a circuit board becomes projection and the opposite side becomes recess. With this ceramic electronic part, the warpage is increased in the course of the preheating step of reflow soldering, resulting in increased positional deviation.

In FIG. 3 of Japanese Patent Laid-open No. Hei 08-130160, it is disclosed that a ceramic part body itself is preliminarily formed with such a warpage that the facing side of the circuit board becomes projection and the opposite side becomes recess and is formed thereon with a pair of outer electrodes. However, no means is proposed for solving the positional deviation.

SUMMARY

According to an embodiment of the present technology, there is provided a ceramic electronic part in which the occurrence of positional deviation at the time of reflow soldering can be prevented as much as possible even where the height (thickness) of the ceramic part body is reduced. According to an embodiment of the present technology, there is also provided a method for manufacturing the ceramic electronic part mentioned above.

In order to achieve the above objects, the present technology contemplates to provide a ceramic electronic part of the type which includes a ceramic part body substantially in a parallelepiped form, the ceramic part body having a functional unit built therein and having a first outer electrode at one end portion thereof and a second outer electrode at an opposite end portion thereof. When opposite directions of two opposing surfaces of the ceramic part body are taken as a first direction, opposite directions of other two opposing surfaces are taken as a second direction, and opposite directions of further two opposing surfaces are taken as a third direction, the first outer electrode contiguously includes a main part provided on one surface in the third direction of the ceramic part body and a sub part provided on one surface in the first direction of the ceramic part body, and the second outer electrode contiguously includes a main part provided on one surface in the third direction of the ceramic part body and a sub part provided on an other surface in the first direction of the ceramic part body, and when the ceramic electronic part is placed on a virtual plane in such a way that the main part of the first outer electrode and the main part of the second outer electrode are facing the virtual plane, respectively, the ceramic electronic part suffers warpage that causes a first maximum gap to occur between a center of the second direction of the main part of the first outer electrode and the virtual plane and also causes a second maximum gap to occur between a center of the second direction of the main part of the second outer electrode and the virtual plane.

The present technology also provides a method for manufacturing a ceramic electronic part including a ceramic part body substantially in a parallelepiped form, the ceramic part body having a functional unit built therein and having a first outer electrode at one end portion thereof and a second outer electrode at an opposite end portion thereof, the method including: providing the ceramic part body in which opposite directions of two opposing surfaces of the ceramic part body are taken as a first direction, opposite directions of other two opposing surfaces are taken as a second direction, and opposite directions of further two opposing surfaces are taken as a third direction; forming, on the ceramic part body, the first outer electrode contiguously including a main part provided on one surface in the third direction of the ceramic part body and a sub part provided on one surface in the first direction of the ceramic part body; and forming, on the ceramic part body, the second outer electrode contiguously including a main part provided on one surface in the third direction of the ceramic part body and a sub part provided on an other surface in the first direction of the ceramic part body, in which the forming the respective outer electrodes are ones. When the ceramic electronic part is placed on a virtual plane in such a way that the main part of the first outer electrode and the main part of the second outer electrode are facing the virtual plane, respectively, the ceramic electronic part suffers warpage that causes a first maximum gap to occur between a center of the second direction of the main part of the first outer electrode and the virtual plane and also causes a second maximum gap to occur between a center of the second direction of the main part of the second outer electrode and the virtual plane.

According to the ceramic electronic part of the technology, positional deviation at the time of reflow soldering can be prevented as much as possible even in the case where the height (thickness) of the ceramic part body is reduced. Moreover, according to the method for manufacturing a ceramic electronic part related to the present technology, the ceramic electronic part can be accurately manufactured.

DETAILED DESCRIPTION OF THE PREFERRED EMBODIMENTS

Figure 1A:
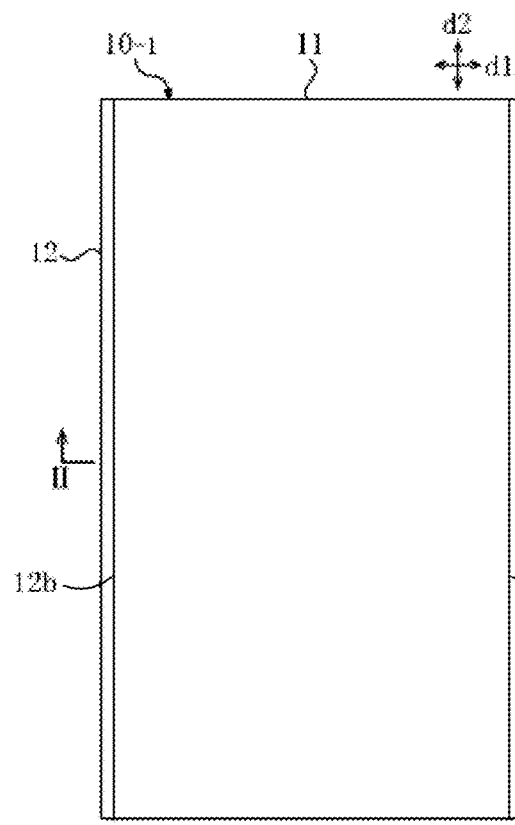
FIG. 1A is a plan view of a laminated ceramic capacitor according to a first embodiment of the technology.

Only for convenience sake, in the following description, the opposite directions (corresponding to left and right directions in FIGS. 1A and 1B) of the two opposing surfaces of the ceramic part body 11 illustrated in FIGS. 1A, 1B, 1C, 1D and 1E are indicated as "first direction d1," the opposite directions (corresponding to vertical directions in FIGS. 1A and 1B) of other two opposing surfaces are indicated as "second direction d2," and the opposite directions (corresponding to vertical directions in FIG. 1B) of further two opposing surface are indicated as "third direction d3."

Further, the dimension along the first direction d1 of the respective constituent elements is indicated as "first direction dimension D1 [reference symbol of this constituent element]," the dimension along the second direction d2 is as "second direction dimension D2 [reference symbol of the constituent element]," and the dimension along the third direction d3 is as "third direction dimension D3 [reference symbol of the constituent element]."

In this regard, however, for the illustration of a first inner electrode layer 11a, a second inner electrode layer 11b, a dielectric layer 11c, a first dielectric margin portion 11d, a second dielectric margin portion 11e, and outer electrodes 12 and 13, the term "thickness" is used concurrently for facilitating better understanding. The numerical values for the respective dimensions merely mean a standard design dimension and do not contain any dimension tolerance on production.

First Embodiment

Now, using FIGS. 1A, 1B, 1C, 1D, 1E, 2, 3A and 3B, the configuration of a laminated ceramic capacitor 10-1 related to the first embodiment of the present technology is illustrated.

The laminated ceramic capacitor 10-1 includes a substantially parallelepiped-shaped ceramic part body 11 having a capacitor unit (reference symbol omitted) built therein as a functional unit, a first outer electrode 12 disposed at one end portion (or a left end portion in FIGS. 1A, 1B and 1C) in the first direction d1 of the ceramic part body 11, and a second outer electrode 13 disposed at the opposite end portion (or a right end portion in FIGS. 1A, 1B and 1C) in the first direction d1 of the ceramic part body 11.

The ceramic part body 11 satisfies conditions that the first direction dimension D1 [11], the second direction dimension D2 [11] and the third direction dimension D3 [11] are such that second direction dimension D2 [11]>first direction dimension D1 [11]>third direction dimension D3 [11].

The main component of the ceramic part body 11 (except for the respective inner electrode layers 11a and 11b forming the capacitor unit) preferably includes a dielectric ceramic selected from barium titanate, strontium titanate, calcium titanate, magnesium titanate, calcium zirconate, calcium titanate zirconate, barium zirconate, titanium oxide, and the like.

The third direction dimension D3 [11] of the ceramic part body 11 may be, for example, not larger than 100 µm in response to the thinning of the laminated ceramic capacitor 10-1, preferably not larger than 50 µm, and 30 µm in minimum. Moreover, although no specific limitation is placed on the first direction dimension D1 [11] and the second direction dimension D2 [11] of the ceramic part body 11, these dimensions can be, for example, within a range of 200 to 1600 µm, respectively, when taking the thinning of the laminated ceramic capacitor 10-1 into consideration.

Further, although FIGS. 1A, 1B, 1C, 1D, 1E, 2, 3A and 3B depict the respective corners and crests of the ceramic part body 11 in such a way that they are not rounded off for convenience sake, the corners and crests may be minutely rounded.

For reference, the main component of the ceramic part body 11 in the prototype of FIGS. 1A, 1B, 1C, 1D, 1E, 2, 3A and 3B (except for the respective inner electrode layers 11a and 11b forming the capacitor unit) is barium titanate. In this case, the first direction dimension D1 [11] of the ceramic part body 11 is 600 µm, the second direction dimension D2 [11] is 1000 µm, and the third direction dimension D3 [11] is 50 µm.

The capacitor unit (reference symbol omitted) provided as a functional unit is configured such that a substantially rectangle-shaped first inner electrode layer 11a and a second inner electrode layer 11b shaped substantially in a rectangle form having substantially the same size as the first inner electrode layer 11a are alternately stacked through a dielectric layer 11c. This capacitor unit is covered with a first dielectric margin portion 11d on one surface of the third direction d3 (i.e. a lower surface in FIGS. 3A and 3B), and the other surface of the third direction d3 (i.e. an upper surface in FIGS. 3A and 3B) is covered with a second dielectric margin portion 11e. Although not illustrated, the capacitor unit is covered with a dielectric margin portion on the both surfaces in the second direction d2, respectively.

Incidentally, the main components of the respective inner electrode layers 11a and 11b are made of a metal preferably selected from nickel, copper, palladium, platinum, silver, gold, alloys thereof, and the like.

Although no specific limitation is placed on the thickness of the respective inner electrode layers 11a and 11b and also on the thickness of the dielectric layer 11c, these thicknesses may be, for example, within a range of 0.3 to 4 µm, respectively, when taking the thinning of the laminated ceramic capacitor 10-1 into account. Additionally, although no specific limitation is placed on the thickness of the respective dielectric margin portions 11d and 11e (which is similar to the dielectric margin portions covering the both surfaces in the second direction d2), the thickness can be, for example, within a range of 3 to 30 µm when taking the thinning of the laminated ceramic capacitor 10-1 into account.

Figure 2:
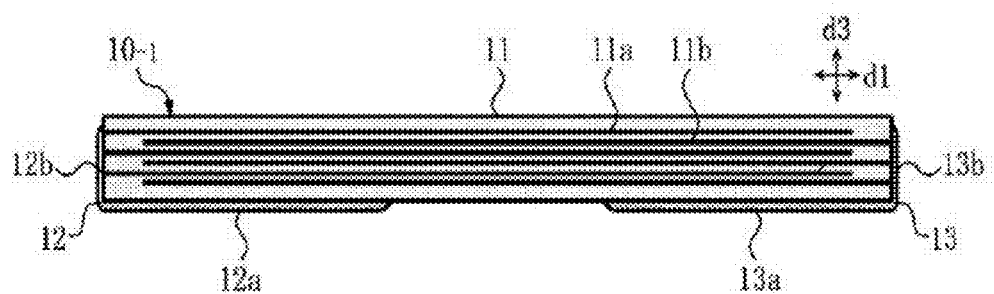
FIG. 2 is an enlarged, sectional view taken along line II-II of FIG. 1A.
Figure 3A:
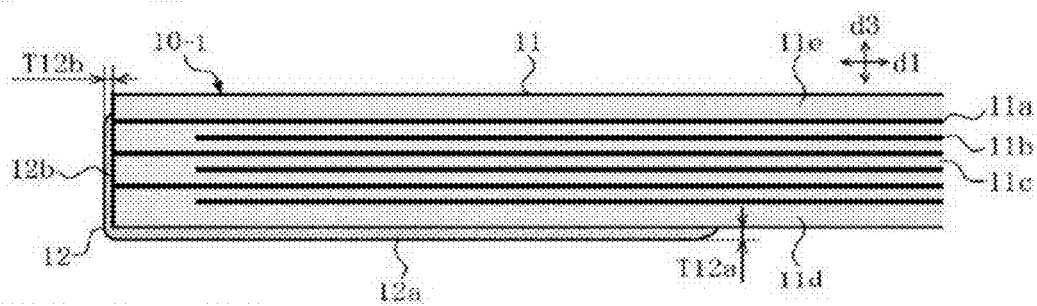
FIGS. 3A and 3B are partially enlarged views of FIG. 2.
Figure 3B:
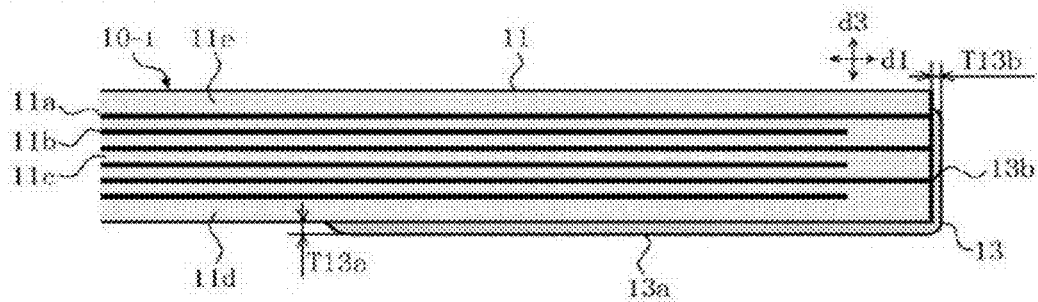

Further, although FIGS. 2, 3A and 3B depict in total six layers of the inner electrode layers 11a and 11b for convenience sake, not only the thicknesses mentioned above, but also the total number of the respective inner electrode layers 11a and 11b and the first direction dimension D1 [11a] and the second direction dimension D2 [11a] of the respective inner electrode layers 11a and 11b can be arbitrarily changed depending on an intended capacity value.

For reference, the main components of the respective inner electrode layers 11a and 11b of the prototype illustrated in FIGS. 1A, 1B, 1C, 1D, 1E, 2, 3A and 3B is nickel, and the thicknesses of the respective inner electrode layers 11a and 11b and the thickness of the dielectric layer 11c are, respectively, 1 µm. The second direction dimensions D2 [11a and 11b] of the respective inner electrode layers 11a and 11b are, respectively, 950 µm and the first direction dimension D1 [11] is 560 µm.

The first outer electrode 12 contiguously includes a main part 12a disposed on one surface (a lower surface in FIG. 2) in the third direction d3 of the ceramic part body 11 and a sub part 12b disposed on one surface (a left surface in FIG. 2) in the first direction d1 of the ceramic part body 11, and is constituted of one metal layer, particularly a sputtered metal layer (i.e. a metal layer formed by sputtering). The sub part 12b of the first outer electrode 12 is connected with an end edge of the respective first inner electrode layers 11a.

The second outer electrode 13 contiguously includes a main part 13a disposed on one surface (a lower surface in FIG. 2) in the third direction d3 of the ceramic part body 11 and a sub part 13b disposed on the other surface (a right surface in FIG. 2) in the first direction d1 of the ceramic part body 11, and is constituted of one metal layer, particularly a sputtered metal layer (i.e. a metal layer formed by sputtering). The sub part 13b of the second outer electrode 13 is connected with an end edge of the respective second inner electrode layers 11b.

Figure 1B:
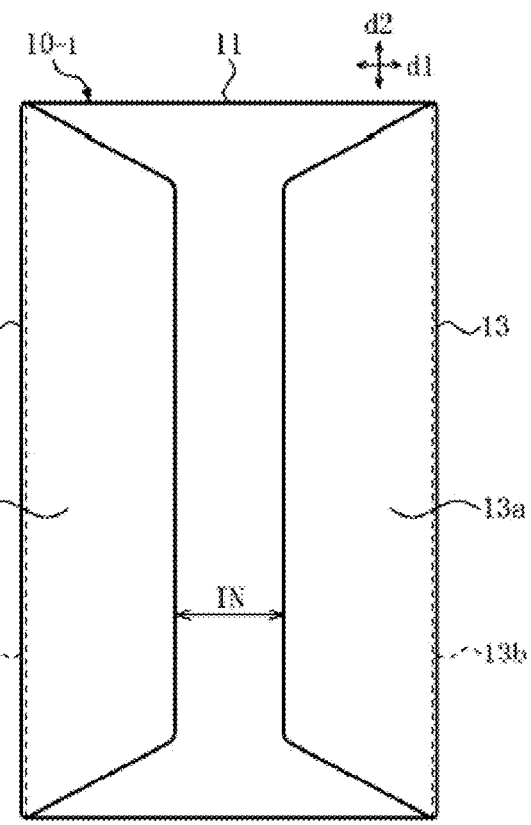
FIG. 1B is a bottom view of the laminated ceramic capacitor.
Figure 1C:
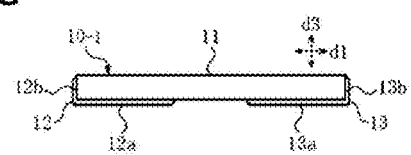
FIG. 1C is a side view of the laminated ceramic capacitor in its second direction.

The main parts 12a and 13a of the outer electrodes 12 and 13 are, respectively, shaped substantially in the trapezoidal form having substantially the same size as is particularly illustrated in FIG. 1B. The respective main parts 12a and 13a are kept apart from each other in the first direction d2 (see interval IN). The sub parts 12b and 13b of the respective outer electrodes 12 and 13 are, respectively, shaped substantially in the form of rectangles having substantially the same size as illustrated in FIGS. 1D and 1E.

Figure 1D:
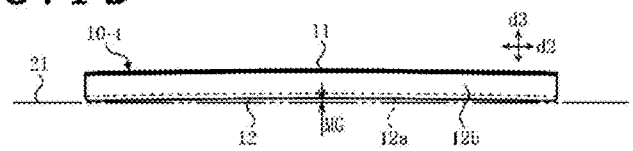
FIGS. 1D and 1E are side views of the laminated ceramic capacitor in its first direction.
Figure 1E:
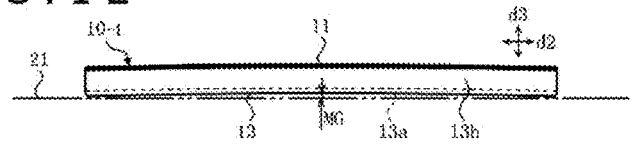

As illustrated in FIGS. 1D and 1E, when the ceramic electronic part 10-1 is placed in such a way that the main parts 12a and 13a of the respective outer electrodes 12 and 13 are facing the virtual plane 21, the ceramic electronic part 10-1 suffers warpage causing first and second maximum gaps MG to occur between the centers of the respective main parts 12a and 13a in the second direction d2 and the virtual plane 21.

The main parts 12a and 13a of the respective outer electrodes 12 and 13 are mainly in the state where a stress for causing the warpage in the ceramic electronic part 10-1 is applied to the ceramic part body 11. On the other hand, the sub parts 12b and 13b of the respective outer electrodes 12 and 13 are mainly in the state where a stress for controlling the magnitudes of the first and second maximum gaps MG between the centers of the main parts 12a and 13a in the second direction d2 and the virtual plane 21 are applied to the ceramic part body 11 although depending on the volumes thereof as will be described hereinafter. In this connection, the states of the main parts 12a and 13a and the sub parts 12b and 13b of the respective outer electrodes 12 and 13 which, respectively, apply the stresses to the ceramic part body 11 can be confirmed, for example, by stress analysis or the like using an X-ray diffraction apparatus.

The term "the center in the second direction d2" used herein means that a center or its vicinity in the second direction d2. More particularly, the warpage is curved in a recess or similar shape at the one surface side of the third direction (i.e. a lower surface side in FIGS. 1D and 1E) of the ceramic electronic part and is in a projection or similar shape at the other surface side of the third direction (an upper surface side in FIGS. 1D and 1E). Nevertheless, the gap at the one surface side in the third direction (i.e. the lower surface side in FIGS. 1D and 1E) of the ceramic electronic part 10-1 does not necessarily become maximum at the center in the second direction d2, but there may be some cases where the maximum is attained at a position slightly distant from the center in the second direction d2.

Further, the volumes of the main parts 12a and 13a of the outer electrodes 12 and 13 are, respectively, larger than those volumes of the sub parts 12b and 13b in order to realize such a state that a stress for causing warpage to occur in the ceramic electronic part 10-1 is applied to the ceramic part body 11.

The magnitude of the volume can be realized according to several methods including {method A1} in which an area of the main parts 12a and 13a as viewed from one surface side thereof in the third direction d3 (see FIG. 1B) is made larger than an area of the sub parts 12b and 13b as viewed from one surface side and the other surface side thereof in the first direction d1 (see FIGS. 1D and 1E), {Method A2} in which thicknesses T12a and T13a of the main parts 12a and 13a along the third direction d3 (see FIGS. 3A and 3B) are, respectively, made larger than thicknesses T12b and T13b of the sub parts 12b and 13b along the first direction d1 (see FIGS. 3A and 3B), {method A3} in which the method A1 and the method A2 are used in combination, and the like.

Incidentally, the main component of the respective outer electrodes 12 and 13 are preferably made of a metal selected from copper, nickel, silver, gold, platinum, palladium, tin, chromium, titanium, tantalum, tungsten, molybdenum, and the like.

As to the thicknesses T12a and T13a of the respective main parts 12a and 13a along the third direction d3 (see FIGS. 3A and 3B) and also the thicknesses T12b and T13b of the respective sub parts 12b and 13b along the first direction d1 (see FIGS. 3A and 3B), no specific limitation is placed thereon. When taking the thinning of the laminated ceramic capacitor 10-1 into account, these thicknesses can be, for example, within a range of 2 to 18 µm, respectively.

Although no specific limitation is placed on the first direction dimensions D1 [12a & 13a] of the respective main parts 12a and 13a, it is preferred to keep the interval IN in the first direction d1 thereof at not less than 100 µm when considering short-circuiting during soldering. Moreover, although no specific limitation is placed on the second direction dimensions D1 [12a & 13a] of the respective main parts 12a and 13a, it is preferred that these dimensions are the same values as or slightly smaller than the second direction dimensions D2 [11] of the ceramic part body 11 when taking the occurrence of warpage having illustrated before into account. This is similar to the second direction dimensions D2 [12b & 13b] of the respective sub parts 12b and 13b.

Further, the third direction dimensions D3 [12b & 13B] of the respective sub parts 12b and 13b can be arbitrarily set so far as they are, respectively, within a range permitting connection with the respective inner electrode layers 11a and also with the respective second inner electrode layers 11b. Moreover, when taking the behavior during soldering into consideration as will be described hereinafter, the first and second maximum gaps MG between the centers of the respective main parts 12a and 13a and the virtual plane 21 can be, for example, within a range of 0.1 to 10 µm in the case where the second direction dimension D2 [11] of the ceramic part body is not larger than 1000 µm. In the case where the second direction dimension D2 [11] exceeds 1000 µm, the dimension D2 [11] can be, for example, within a range of 0.1 to 20 µm. Incidentally, for the measurement of an amount of warpage including the first and second maximum gaps MG and its shape, there can be adopted, for example, a method of the measurement based on warpage profile data which is obtained by scanning the respective main parts 12a and 13a with a laser beam along the second direction d2 by use of a laser microscope, or based on the data including an extrapolation line added to the warpage profile data.

For reference, the main component of the respective outer electrodes 12 and 13 of the prototype used as basis for FIGS. 1A, 1B, 1C, 1D, 1E, 2, 3A and 3B is copper, the thicknesses T12a and T13a of the main parts 12a and 13a along the first direction d3 are 7 µm, respectively, and the thicknesses T12b and T13b of the sub parts 12b and 13b along the first direction d1 are 2 µm, respectively. The first direction dimensions D1 [12a & 13a] of the main parts 12a and 13a of the outer electrodes 12 and 13 are 210 µm, respectively, the second direction dimensions D2 [12a & 13a] are 1000 µm, respectively, the interval IN is 156 µm, the third direction dimensions D3 of the sub parts 12b and 13b [12b & 13b] are 40 µm, respectively, and the second direction dimensions D2 [12a & 13a] are 1000 µm, respectively. In addition, the first and second maximum gaps MG between the centers of the respective main parts 12a and 13a in the second direction d2 and the virtual plane 21 are 3 µm, respectively.

That is, with this prototype, the magnitude relationship between the volumes of the main parts 12a and 13a and the volumes of the sub parts 12b and 13b set out hereinbefore is realized according to the combination of the areas of the main parts 12a and 13a>the areas of the sub parts 12b and 13b and the thicknesses of the main parts 12a and 13a>the thicknesses of the sub parts 12b and 13b.

Figure 4A:
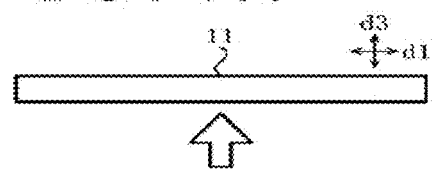
FIGS. 4A and 4B are illustrative views illustrating a method for manufacturing the laminated ceramic capacitor illustrated in FIG. 1A.
Figure 4B:
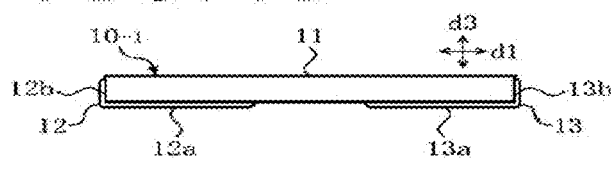

Next, with reference to FIGS. 4A and 4B, a method for manufacturing the laminated ceramic capacitor 10-1 is illustrated.

In the manufacture, a ceramic part body 11 is initially provided. This ceramic part body 11 can be provided by appropriately laminating ceramic green sheets and ceramic green sheets on which a conductor pattern for inner electrode has been formed and subjecting to thermocompression bonding to prepare an unsintered laminated sheet, cutting the unsintered laminated sheet into unsintered ceramic chips, subsequently sintering the unsintered ceramic chips to prepare ceramic chips, followed by subjecting the ceramic chips to barrel polishing, if necessary.

As illustrated in FIG. 4A, a sputtering mask is disposed on the ceramic part body 11, followed by sputtering toward one surface of the third direction d1 (i.e. a lower surface in FIG. 4A). Since the first direction dimension D1 [11] of the ceramic part body 11 is 100 µm or below, not only the main parts 12a and 13a are formed on one surface (i.e. a lower surface in FIG. 4A) in the third direction d1 of the ceramic part body 11, but also the sub parts 12b and 13b whose thickness is smaller than the thickness of the main parts 12a and 13a are contiguously formed on both surfaces in the second direction d1 of the ceramic part body 11 by wraparound of sputtered particles. In this way, the outer electrodes 12 and 13 are formed, respectively. More particularly, when the outer electrodes 12 and 13 (sputtered metal layers) are formed on the ceramic part body 11, the ceramic part body 11 may be preliminarily subjected to plasma cleaning on the surfaces thereof prior to carrying out sputtering, if necessary, thereby enhancing the adhesion of the sputtered metal layers to the ceramic part body 11.

In order that a desired warpage is applied to the laminated ceramic capacitor 10-1, it is preferred to increase the denseness of metal particles in the outer electrodes 12 and 13, particularly, in the main parts 12a and 13a, formed on the ceramic part body 11 by sputtering. The increase of the denseness can be realized by several methods including {method B1} in which the pressure of an inert gas in a chamber is reduced, e.g. a pressure of an inert gas in a chamber is reduced to 0.05 to 0.1 Pa and electric power is set at 300 to 500 W, {method B2} in which an inert gas having a large mass is used as an inert gas in a chamber, e.g. an inert gas having a large mass, such as Xe gas or the like, is used and electric power is set at 300 to 500 W, and {method B3} which is a combination of method B1 and method B2.

Figure 5A:
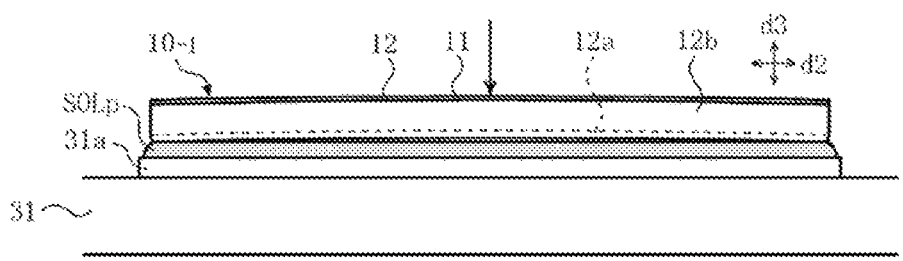
FIGS. 5A and 5B are illustrative views illustrating the advantage and effect of the laminated ceramic capacitor illustrated in FIG. 1A.
Figure 5B:
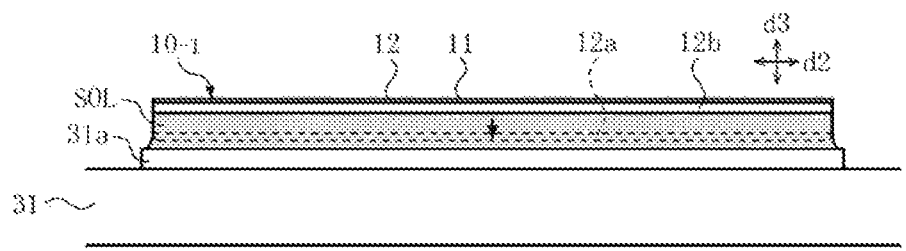

Next, reference is made to FIGS. 5A and 5B so as to illustrate the advantages and effects obtained according to the laminated ceramic capacitor 10-1.

In order to mount the laminated ceramic capacitor 10-1 on a circuit board 31 by reflow soldering, a solder paste SOLp is, respectively, applied to conductor pads 31a corresponding to the outer electrodes 12 and 13 provided on the circuit board 31 as is particularly illustrated in FIG. 5A, followed by mounting the laminated ceramic capacitor 10-1 in such a way that the main parts 12a and 13a of the outer electrodes 12 and 13 are, respectively, in contact with the solder paste SOLp.

As having previously set out with reference to FIGS. 1D and 1E, since the laminated ceramic capacitor 10-1 has warpage that causes first and second maximum gaps MG between the centers in the second direction d2 of the main parts 12a and 13a of the outer electrodes 12 and 13 and the virtual plane 21, the laminated ceramic capacitor 10-1 after mounting is in contact with the solder paste SOLp on the respective conductor pads 31a at least at the opposite end portions in the second direction d2 of the main parts 12a and 13a as illustrated in FIG. 5A. More particularly, the laminated ceramic capacitor 10-1 is mounted in such a way that the main parts 12a and 13a are in four-point or similar contact form with the solder paste SOLp, so that the mounting posture and direction do not become unstable and no positional deviation occurs.

After the mounting of the laminated ceramic capacitor 10-1 on the circuit board 31, the circuit board 31 is charged into a reflow oven, not illustrated, followed by soldering the outer electrodes 12 and 13 to the respective conductor pads 31a through a preheating step, an actual heating step, and a cooling step. The temperature of the actual heating step corresponds to a melting temperature of the solder paste SOLp, and the temperature of the preheating step is lower than the temperature of the actual heating step.

The thermal expansion coefficient of thermal expansion of the outer electrodes 12 and 13 which are mainly composed of a metal is greater than the coefficient of thermal expansion of the ceramic part body 11 whose main component is a ceramic. For this reason, in the preheating step of the reflow soldering, a warpage correcting force is exerted on the laminated ceramic capacitor based on the thermal expansion of the main parts of 12a and 13a of the outer electrodes 12 and 13 as is particularly illustrated in FIG. 5B. More particularly, the contact form (i.e. a four-point contact or contact form close thereto) of the main parts 12a and 13a to the solder paste SOLp is changed to a two-face contact or a contact form close thereto, and this change permits the mounting posture of the laminated ceramic capacitor 10-1 to be stabilized.

In fact, the actual heating step of the reflow soldering is carried out after the mounting posture of the laminated ceramic capacitor 10-1 has been stabilized, under which if the solder paste SOLp is melted in the actual heating step, no deviation occurs in the flow of the melted solder SOL and thus, no positional deviation due to the flow deviation occurs in the laminated ceramic capacitor 10-1.

The melted solder SOL is solidified in the cooling step of the reflow soldering. In the cooling step, a warpage restoring force is exerted on the laminated ceramic capacitor 10-1 having undergone warpage correction on the basis of the thermal shrinkage of the main parts 12a and 13a of the outer electrodes 12 and 13.

However, in the cooling step of the reflow soldering, the solidification of the melted solder SOL begins, for which the warpage of the laminated ceramic capacitor 10-1 is slightly restored, but is not completely restored. More particularly, since the main parts 12a and 13a of the outer electrodes 12 and 13 and the conductor pads 31a are, respectively, connected via the solder SOL, so that no positional deviation occurs in the laminated ceramic capacitor 10-1 and thus no connection failure occurs.

Incidentally, in the actual heating step of the reflow soldering, part of the melted solder SOL is wetted up to the sub parts 12b and 13b of the outer electrodes 12 and 13. As a matter of course, the warpage restoration of the laminated ceramic capacitor 10-1 in the cooling step of the reflow soldering can be suppressed due to the solidification of the wetted-up portions, resulting in the suppression of occurrence of the positional deviation and connection failure.

In this way, in a case where the laminated ceramic capacitor 10-1 is reduced in height (thickness) of the ceramic part body, particularly to 100 µm or below, the positional deviation during the reflow soldering can be reliably prevented, thus being very beneficial in practical applications.

Next, reference is made to FIGS. 6A, 6B, 6C, 7A and 7B to illustrate a modification example of the outer electrodes 12 and 13 of the laminated ceramic capacitor 10-1.

Figure 6A:
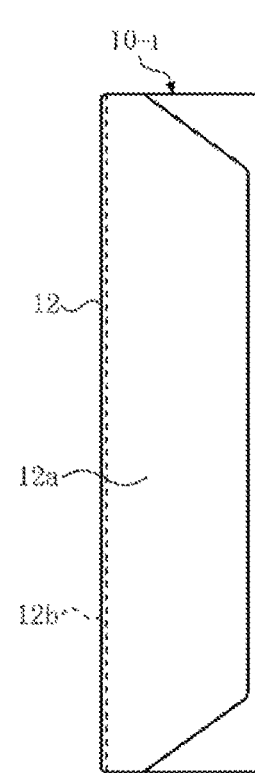
FIGS. 6A, 6B and 6C are illustrative views illustrating a modification example of a main part of the respective outer electrodes illustrated in FIG. 1B.
Figure 6B:
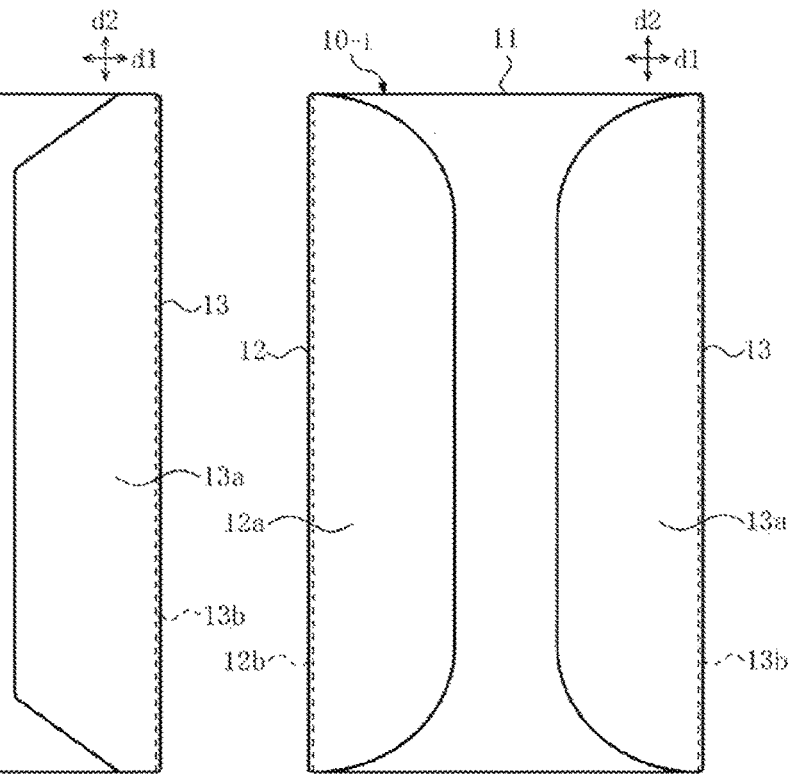
Figure 6C:
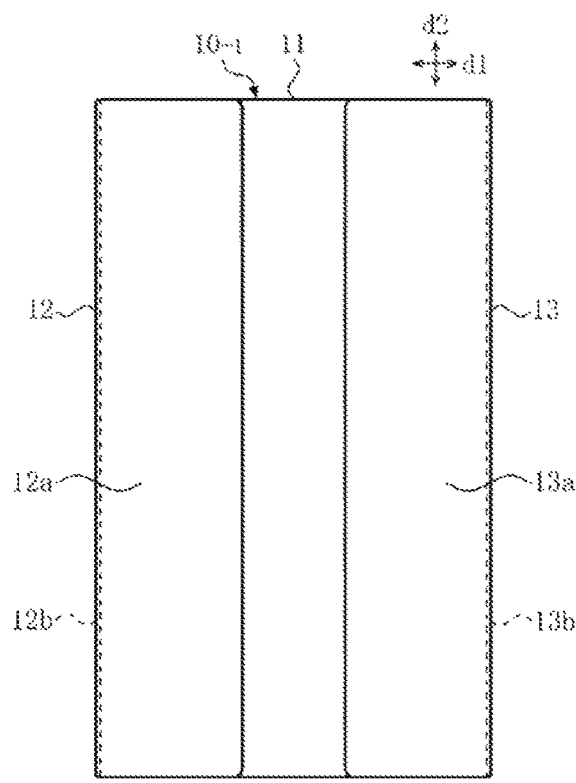

FIGS. 6A, 6B and 6C, respectively, illustrate other shapes of the main parts 12a and 13a of the outer electrodes 12 and 13. More particularly, although the main parts 12a and 13a in FIG. 1B are, respectively, illustrated substantially in a trapezoidal form, the main parts 12a and 13a may be shaped substantially in a hexagonal form as illustrated in FIG. 6A or may be in a form in which both end portions in the second direction d2 are rounded as illustrated in FIG. 6B, or may be substantially in a rectangular form as illustrated in FIG. 6C.

In other words, no specific limitation is placed on the shape of the main parts 12a and 13a of the outer electrodes 12 and 13 so far as the shape is able to apply, onto the ceramic part body 11, a stress capable of causing warpage to occur in the laminated ceramic capacitor 10-1.

Figure 7A:
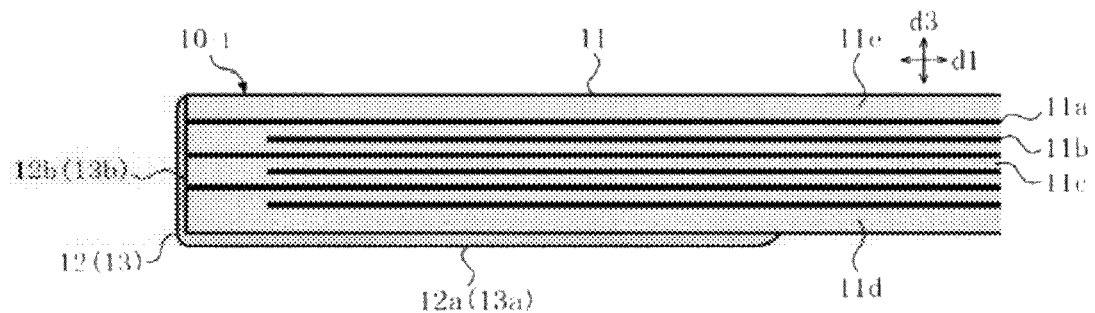
FIGS. 7A and 7B are illustrative views illustrating a modification example of a sub part of the respective outer electrodes illustrated in FIGS. 3A and 3B.
Figure 7B:
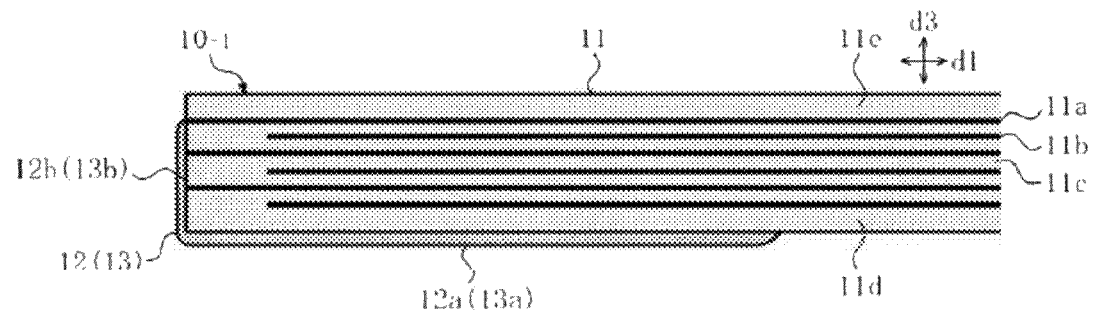

FIGS. 7A and 7B, respectively, illustrate other shapes of the sub parts 12b and 13b of the outer electrodes 12 and 13. FIGS. 3A and 3B illustrate the sub parts 12b and 13b each having an upper end thereof that is located between the uppermost first inner electrode layer 11a and the upper ends of both surfaces in the first direction d1 of the ceramic part body 11. Instead, the upper end positions of the sub parts 12b and 13b may be increased to a level equal to or substantially equal to the upper ends of both surfaces in the first direction d1 of the ceramic part body 11 as illustrated in FIG. 7A. Alternatively, the upper end positions of the sub parts 12b and 13b may be decreased to a level equal to the position of the first inner electrode layer 11a as illustrated in FIG. 7B.

That is, as to the third direction dimensions D3 [12b & 13b] of the sub parts 12b and 13b of the outer electrodes 12 and 13, no specific limitation is placed so far as the end edges of the respective first inner electrode layers 11a and the end edges of the respective second inner electrode layers 11b are connected with each other.

Second Embodiment

Figure 8A:
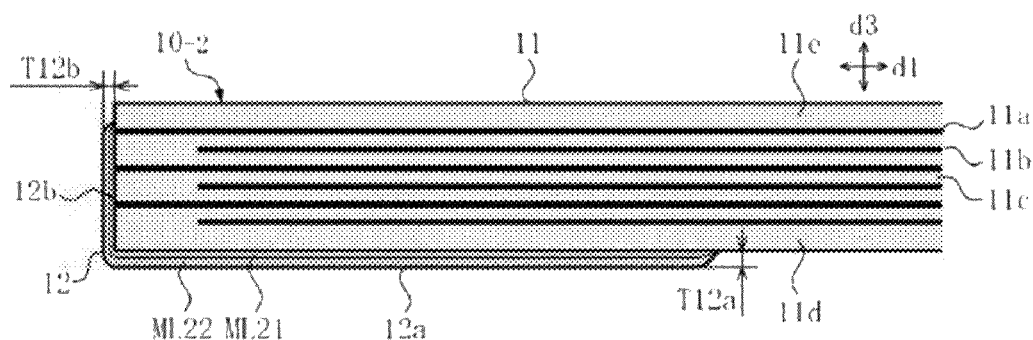
FIGS. 8A and 8B are schematic views illustrating a laminated ceramic capacitor according to a second embodiment of the technology and corresponding to FIGS. 3A and 3B, respectively.
Figure 8B:
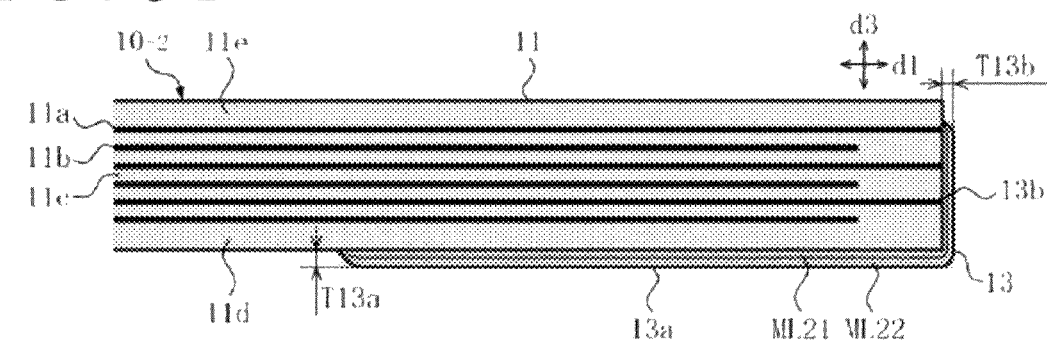

FIGS. 8A and 8B illustrate a laminated ceramic capacitor 10-2 related to a second embodiment of the present technology. FIGS. 8A and 8B correspond to FIGS. 3A and 3B, respectively.

The laminated ceramic capacitor 10-2 differs from the laminated ceramic capacitor 10-1 in that the outer electrodes 12 and 13 are constituted of two-layer metal layers ML21 and ML22, respectively, with the others being the same as the laminated ceramic capacitor 10-1.

In a case where the outer electrodes 12 and 13 are constituted of the two-layer metal layers ML21 and ML22, respectively, the two-layer metal layers ML21 and ML22 may both be made of a sputtered metal layer (i.e. a metal layer formed by sputtering), or may be such that the inner metal layer ML21 is formed of a sputtered metal layer and the outer metal layer ML22 is formed of an electroplated metal layer (i.e. a metal layer formed by electroplating). In this regard, the electroplated metal layer may be replaced by an electroless plated metal layer (i.e. a metal layer formed by electroless plating).

Like the case of one metal layer, the main component of the two-layer metal layers ML21 and ML22 can be preferably selected from copper, nickel, silver, gold, platinum, palladium, tin, chromium, titanium, tantalum, tungsten, molybdenum, and the like. It is not necessary to use the same component for the two-layer metal layers ML21 and ML22, and thus different components may be used therefor. In the case where different components are used for the two-layer metal layers ML21 and ML22, an appropriate combination of the components can be adopted while considering the mutual adhesion and solderability: the main component of the inner metal layer ML21 is chosen, for example, from chromium, titanium, or tungsten and the main component used for the outer metal layer ML22 is copper; or copper is used as a main component for the inner metal layer ML21 and tin is used as a main component for the outer metal layer ML22.

Further, in a case where the outer electrodes 12 and 13 are made up of the two-layer metal layers ML21 and ML22, respectively, no specific limitation is placed on the thicknesses T12a and T13a along the third direction d3 of the main parts 12a and 13a (see FIGS. 8A and 8B) and also on the thicknesses T12b and T13b along the first direction d1 of the sub parts 12b and 13b (see FIGS. 8A and 8B). Nevertheless, like the case of the one-layer metal layer, the thicknesses can be, for example, within a range of 2 to 18 μm, respectively, while taking the thinning of the laminated ceramic capacitor into account.

When using this laminated ceramic capacitor 10-2, similar advantages and effects as with the laminated ceramic capacitor 10-1 can be obtained. The laminated ceramic capacitor 10-2 can make appropriate use of other shapes of the main parts 12a and 13a illustrated in FIGS. 6A, 6B and 6C and also of other shapes of the sub parts 12b and 13b illustrated in FIGS. 7A and 7B.

It will be noted that if the outer electrodes 12 and 13 are constituted of the two-layer metal layers ML21 an ML22, respectively, under which the outer metal layer ML22 is formed of an electroplated metal layer and the sub parts 12b and 13b are so shaped as illustrated in FIG. 7A, the upper end of the electroplated metal layer might wrap around the upper surface of the ceramic capacitor 11 at the time when the outer metal layer ML22 (electroplated metal layer) is formed. In this connection, however, if the wraparound amount and thickness are small, no trouble occurs in the thinning of the laminated ceramic capacitor 10-2.

Third Embodiment

Figure 9A:
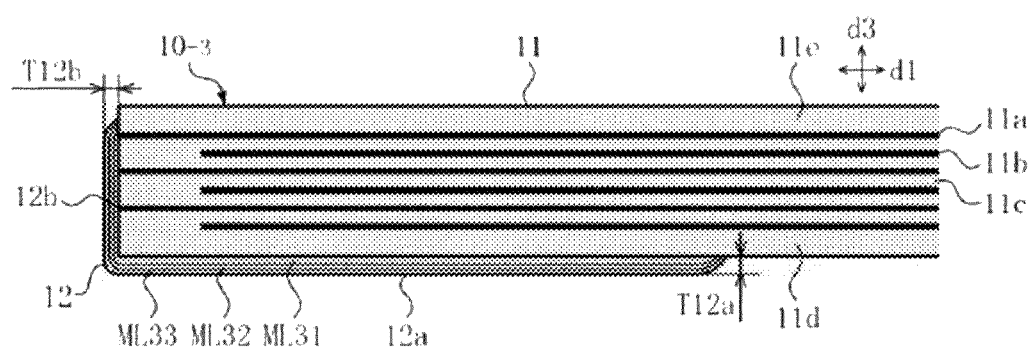
FIGS. 9A and 9B are schematic views illustrating a laminated ceramic capacitor according to a third embodiment of the technology and corresponding to FIGS. 3A and 3B, respectively.
Figure 9B:
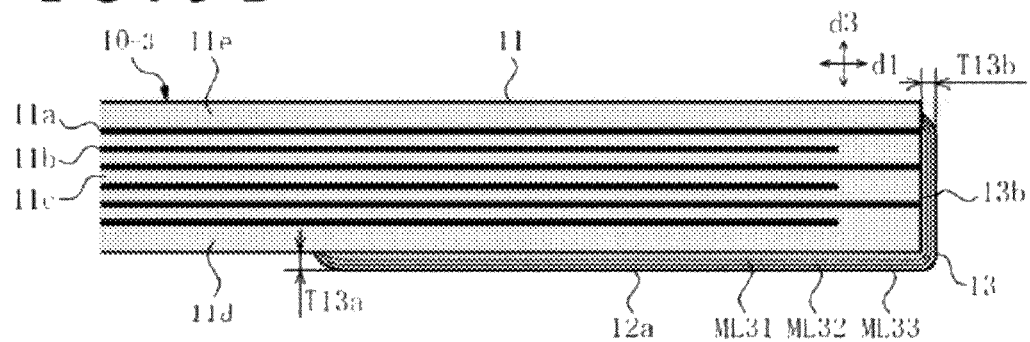

FIGS. 9A and 9B, respectively, illustrate a laminated ceramic capacitor 10-3 related to a third embodiment of the present technology. FIGS. 9A and 9B correspond to FIGS. 3A and 3B, respectively.

The laminated ceramic capacitor 10-3 differs from the laminated ceramic capacitor 10-1 in that the outer electrodes 12 and 13 are constituted of three-layer metal layers ML31 to ML33, respectively, with the others being the same as the laminated ceramic capacitor 10-1.

In a case where the outer electrodes 12 and 13 are constituted of the three-layer metal layers ML31 to ML33, respectively, the three-layer metal layers ML31 to ML33 may all be constituted of a sputtered metal layer (i.e. a metal layer formed by sputtering), or may be such that the inner metal layer ML31 is formed of a sputtered metal layer, the intermediate metal layer ML32 is formed of a sputtered metal later or an electroplated metal layer (i.e. a metal layer formed by electroplating), and the outermost metal layer ML33 may be formed of an electroplated metal layer (i.e. a layer formed by electroplating). In this regard, the electroplated metal layer may be replaced by an electroless plated metal layer (i.e. a metal layer formed by electroless plating).

Like the case of one-layer metal layer, the main component of the three-layer metal layers ML31 to ML33 can be preferably selected from copper, nickel, silver, gold, platinum, palladium, tin, chromium, titanium, tantalum, tungsten, molybdenum, and the like. It is not necessary to use the same component for the three-layer metal layers ML31 to ML33, and thus different components may be used therefor. In the case where different components are used for the three-layer metal layers ML31 to ML33, an appropriate combination of the components can be adopted while considering the mutual adhesion and solderability: the main component of the innermost metal layer ML31 is chosen, for example, from chromium, titanium, or tungsten, the main component of the intermediate metal layer ML32 is copper, and the outermost metal layer is tin; or copper is used as a main component for the innermost metal layer ML31, nickel is used for the intermediate metal layer ML32 and tin is used for the outermost metal layer ML33.

Further, in a case where the outer electrodes 12 and 13 are made up of the three-layer metal layers ML31 to ML33, respectively, no specific limitation is placed on the thicknesses T12a and T13a along the third direction d3 of the main parts 12a and 13a (see FIGS. 9A and 9B) and also on the thicknesses T12b and T13b along the first direction d1 of the sub parts 12b and 13b (see FIGS. 9A and 9B). Nevertheless, like the case of the one-layer metal layer, the thicknesses can be, for example, within a range of 2 to 18 μm, respectively, while taking the thinning of the laminated ceramic capacitor 10-3 into account.

When using this laminated ceramic capacitor 10-3, similar advantages and effects as with the laminated ceramic capacitor 10-1 can be obtained. The laminated ceramic capacitor 10-3 can make appropriate use of other shapes of the main parts 12*a* and 13*a* illustrated in FIGS. 6A, 6B and 6C and also of other shapes of the sub parts 12*b* and 13*b* illustrated in FIGS. 7A and 7B.

It will be noted that in a case where the outer electrodes 12 and 13 are, respectively, constituted of the three-layer metal layers ML31 to ML33, under which either the intermediate metal layer ML32 and the outermost metal layer ML33, or the outermost metal layer ML33 is made of an electroplated metal layer and the sub parts 12*b* and 13*b* are so shaped as illustrated in FIG. 7A, the upper end of the electroplated metal layer might wrap around the upper surface of the ceramic capacitor 11 at the time when the intermediate metal layer ML32 and the outermost metal layer ML33 (both of which are an electroplated metal layer), or the outermost metal layer ML33 (electroplated metal layer) is formed. In this connection, however, if the wrap-around amount and thickness are small, no trouble occurs in the thinning of the laminated ceramic capacitor 10-3.

Other Embodiments

As having stated hereinabove, the present technology has been illustrated on the embodiments of the present technology applied to the laminated ceramic capacitors. The technology can be applied to ceramic electronic parts other than the laminated ceramic capacitor and including, for example, a laminated ceramic varistor, a laminated ceramic inductor, and the like. More particularly, if the present technology is applied to any ceramic electronic parts having a ceramic part body 11 substantially in a parallelepiped form having a functional unit built therein, and a first outer electrode 12 provided at one end portion thereof and a second outer electrode 13 at the opposite end portion, such advantages and effects as described before can be obtained.

The ceramic part body 11 having been illustrated here is one that satisfies the conditions of second direction dimension D2 [11]>first direction dimension D1 [11]>third direction dimension D3 [11]. In this connection, however, similar advantages and effects as illustrated before have been obtained according to the present technology even in the case where the ceramic part body 11 satisfies the conditions of second direction dimension D2 [11]=first direction dimension D1 [11]>third direction dimension D3 [11] and also of first direction dimension D1 [11]>second direction dimension D2 [11]>third direction dimension D3 [11].

Furthermore, it has been illustrated that the respective outer electrodes 12 and 13 are made of a one-layer, two-layer or three-layer metal layer. Even in the case where these outer electrodes 12 and 13 may be formed of a four-layer or more multilayer metal layer, respectively, similar advantages and effects as in the present technology can be obtained so far as at least an innermost metal layer is made of a sputtered metal layer (i.e. a metal layer formed by sputtering).

The present disclosure contains subject matter related to that disclosed in Japanese Priority Patent Application JP 2018-051355 filed in the Japan Patent Office on Mar. 19, 2018, the entire content(s) of which is(are) hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A ceramic electronic part of the type which comprises a ceramic part body substantially in a parallelepiped form, the ceramic part body having a functional unit built therein and having a first outer electrode at one end portion thereof and a second outer electrode at an opposite end portion thereof,
   wherein when opposite directions of two opposing surfaces of the ceramic part body are taken as a first direction, opposite directions of other two opposing surfaces are taken as a second direction, and opposite directions of further two opposing surfaces are taken as a third direction, the first outer electrode contiguously includes a main part provided on one surface in the third direction of the ceramic part body and a sub part provided on one surface in the first direction of the ceramic part body, and the second outer electrode contiguously includes a main part provided on one surface in the third direction of the ceramic part body and a sub part provided on an other surface in the first direction of the ceramic part body, and
   when the ceramic electronic part is placed on a virtual plane in such a way that the main part of the first outer electrode and the main part of the second outer electrode are facing the virtual plane, respectively, the ceramic electronic part suffers warpage that causes a first maximum gap to occur between a center of the second direction of the main part of the first outer electrode and the virtual plane and also causes a second maximum gap to occur between a center of the second direction of the main part of the second outer electrode and the virtual plane.

2. The ceramic electronic part as defined in claim 1, wherein the main part of the first outer electrode and the main part of the second outer electrode are in such a state that a stress for causing the warpage to occur in the ceramic electronic part is applied to the ceramic part body.

3. The ceramic electronic part as defined in claim 1, wherein the sub part of the first outer electrode and the sub part of the second outer electrode are in such a state that a stress for controlling a magnitude of the first maximum gap between a center in the second direction of the main part of the first outer electrode and the virtual plane and a magnitude of the second maximum gap between a center in the second direction of the main part of the second outer electrode and the virtual plane is applied to the ceramic part body.

4. The ceramic electronic part as defined in claim 1, wherein a volume of the main part of the first outer electrode is larger than a volume of the sub part of the first outer electrode, and a volume of the main part of the second outer electrode is larger than a volume of the sub part of the second outer electrode.

5. The ceramic electronic part as defined in claim 4, wherein an area of the main part of the first outer electrode as viewed from one surface side of the third direction is larger than an area of the sub part of the first outer electrode as viewed from one surface side of the first direction, and an area of the main part of the second outer electrode as viewed from one surface side of the third direction is larger than an area of the sub part of the second outer electrode as viewed from the other surface side of the first direction.

6. The ceramic electronic part as defined in claim 4, wherein a thickness along the third direction of the main part of the first outer electrode is larger than a thickness along the first direction of the sub part of the first outer electrode, and a thickness along the third direction of the main part of the second outer electrode is larger than a thickness along the first direction of the sub part of the second outer electrode.

7. The ceramic electronic part as defined in claim 1, wherein the first outer electrode and the second outer electrode include, respectively, a one-layer, two-layer, or three-layer metal layer.

8. The ceramic electronic part as defined in claim 7, wherein with the one-layer, two-layer, or three-layer metal layer, the metal layer is made entirely of a sputtered metal layer.

9. The ceramic electronic part as defined in claim 7, wherein with the two-layer metal layer, an inner metal layer includes a sputtered metal layer, and an outer metal layer includes a sputtered metal layer or an electroplated metal layer.

10. The ceramic electronic part as defined in claim 7, wherein with the three-layer metal layer, an innermost metal layer includes a sputtered metal layer, an intermediate metal layer includes a sputtered metal layer or an electroplated metal layer, and an outermost metal layer includes an electroplated metal layer.

11. The ceramic electronic part as defined in claim 1, wherein when a dimension along the first direction is taken as a first direction dimension, a dimension along the second direction is taken as a second direction dimension, and a dimension along the third direction is taken as a third direction dimension, the first direction dimension, the second direction dimension, and the third direction dimension of the ceramic part body satisfy the conditions of second direction dimension>first direction dimension>third direction dimension.

12. The ceramic electronic part as defined in claim 11, wherein the third direction dimension of the ceramic part body is 100 μm or below.

13. The ceramic electronic part as defined in claim 11, wherein the third direction dimension of the ceramic part body is 50 μm or below.

14. The ceramic electronic part as defined in claim 1, wherein the ceramic electronic part includes a laminated ceramic capacitor.

15. The ceramic electronic part as defined in claim 1, wherein in a case where the second direction dimension of the ceramic part body is 1000 μm or below, the first and second maximum gaps are within a range of 0.1 to 10 μm, respectively.

16. The ceramic electronic part as defined in claim 1, wherein in a case where the second direction dimension of the ceramic part body exceeds 1000 μm, the first and second maximum gaps are within a range of 0.1 to 20 μm, respectively.

17. A method for manufacturing a ceramic electronic part including a ceramic part body substantially in a parallelepiped form, the ceramic part body having a functional unit built therein and having a first outer electrode at one end portion thereof and a second outer electrode at an opposite end portion thereof, the method comprising:
providing the ceramic part body in which opposite directions of two opposing surfaces of the ceramic part body are taken as a first direction, opposite directions of other two opposing surfaces are taken as a second direction, and opposite directions of further two opposing surfaces are taken as a third direction;
forming, on the ceramic part body, the first outer electrode contiguously including a main part provided on one surface in the third direction of the ceramic part body and a sub part provided on one surface in the first direction of the ceramic part body; and
forming, on the ceramic part body, the second outer electrode contiguously including a main part provided on one surface in the third direction of the ceramic part body and a sub part provided on an other surface in the first direction of the ceramic part body, in which the forming the respective outer electrodes are ones,
wherein when the ceramic electronic part is placed on a virtual plane in such a way that the main part of the first outer electrode and the main part of the second outer electrode are facing the virtual plane, respectively, the ceramic electronic part suffers warpage that causes a first maximum gap to occur between a center of the second direction of the main part of the first outer electrode and the virtual plane and also causes a second maximum gap to occur between a center of the second direction of the main part of the second outer electrode and the virtual plane.

18. The method for manufacturing a ceramic electronic part as defined in claim 17, wherein the main part of the first outer electrode and the main part of the second outer electrode are in such a state that a stress for causing warpage to occur in the ceramic electronic part is applied to the ceramic part body.

19. The method for manufacturing a ceramic electronic part as defined in claim 17, wherein the sub part of the first outer electrode and the sub part of the second outer electrode are in such a state that a stress for controlling a magnitude of the first maximum gap between a center in the second direction of the main part of the first outer electrode and the virtual plane and a magnitude of the second maximum gap between a center in the second direction of the main part of the second outer electrode and the virtual plane is applied to the ceramic part body.

20. The method for manufacturing a ceramic electronic part as defined in claim 17, wherein a volume of the main part of the first outer electrode is larger than a volume of the sub part of the first outer electrode, and a volume of the main part of the second outer electrode is larger than a volume of the sub part of the second outer electrode.

* * * * *